US008676563B2

(12) United States Patent
Soricut et al.

(10) Patent No.: US 8,676,563 B2
(45) Date of Patent: *Mar. 18, 2014

(54) PROVIDING HUMAN-GENERATED AND MACHINE-GENERATED TRUSTED TRANSLATIONS

(75) Inventors: Radu Soricut, Manhattan Beach, CA (US); Narayanaswamy Viswanathan, Palo Alto, CA (US); Daniel Marcu, Manhattan Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/820,061

(22) Filed: Jun. 21, 2010

(65) Prior Publication Data

US 2011/0082684 A1  Apr. 7, 2011

Related U.S. Application Data

(63) Continuation-in-part of application No. 12/572,021, filed on Oct. 1, 2009, now Pat. No. 8,380,486.

(51) Int. Cl.
*G06F 17/28* (2006.01)

(52) U.S. Cl.
USPC .................................................. 704/2; 704/5

(58) Field of Classification Search
USPC ....................................................... 704/1–10
See application file for complete search history.

(56) References Cited

U.S. PATENT DOCUMENTS

| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |

(Continued)

FOREIGN PATENT DOCUMENTS

| EP | 0469884 | 2/1992 |
| EP | 0715265 | 6/1996 |

(Continued)

OTHER PUBLICATIONS

"Rapp, Reinhard, ""Identifying Word Translations in Non-Parallel Texts,"" 1995, 33rd Annual Meeting of the ACL, pp. 320-322."

(Continued)

*Primary Examiner* — Samuel G Neway
(74) *Attorney, Agent, or Firm* — Carr & Ferrell LLP

(57) ABSTRACT

Customers having a translation project to select a translation method from a variety of options, ranging from a completely human translation to a completely automated translation. For human translations, translation job information may be communicated through one or more network service modules which execute within a network service application, such as a web-based networking application. A network service module may register a user having an account with the network service application as a translator and communicate translation jobs to the user. One or more users who express interest in performing the translation are selected to perform a translation job, each job comprising at least a portion of the translation project. After a user provides a translation for the translation job, the translation is analyzed to generate a trust level prediction for the translation. A user translation profile may be updated after each translation to reflect the user's performance.

27 Claims, 7 Drawing Sheets

(56) References Cited

U.S. PATENT DOCUMENTS

| | | |
|---|---|---|
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |

(56) References Cited

U.S. PATENT DOCUMENTS

| | | |
|---|---|---|
| 7,191,115 B2 | 3/2007 | Moore |
| 7,194,403 B2 | 3/2007 | Okura et al. |
| 7,197,451 B1 | 3/2007 | Carter et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 8,060,360 B2 | 11/2011 | He |
| 8,145,472 B2* | 3/2012 | Shore et al. ............ 704/2 |
| 8,214,196 B2 | 7/2012 | Yamada et al. |
| 8,244,519 B2 | 8/2012 | Bicici et al. |
| 8,265,923 B2 | 9/2012 | Chatterjee et al. |
| 8,615,389 B1 | 12/2013 | Marcu |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0087313 A1 | 7/2002 | Lee et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1* | 12/2002 | Greene et al. ............ 704/2 |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0050182 A1 | 3/2007 | Sneddon et al. |
| 2007/0078654 A1 | 4/2007 | Moore |

(56) References Cited

U.S. PATENT DOCUMENTS

| | | |
|---|---|---|
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0065478 A1 | 3/2008 | Kohlmeier et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1* | 10/2008 | Shimohata .................... 704/3 |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0125497 A1 | 5/2009 | Jiang et al. |
| 2009/0234634 A1 | 9/2009 | Chen et al. |
| 2009/0241115 A1 | 9/2009 | Raffo et al. |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082684 A1 | 4/2011 | Soricut et al. |
| 2012/0323554 A1 | 12/2012 | Hopkins et al. |

FOREIGN PATENT DOCUMENTS

| | | |
|---|---|---|
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| WO | WO03083709 | 10/2003 |

OTHER PUBLICATIONS

Rayner et al.,"Hybrid Language Processing in the Spoken Language Translator," IEEE, pp. 107-110.

"Resnik, P. and Smith, A., ""The Web as a Parallel Corpus,"" Sep. 2003, Computational Linguistics, SpecialIssue on Web as Corpus, vol. 29, Issue 3, pp. 349-380."

"Resnik, P. and Yarowsky, D. ""A Perspective on Word Sense Disambiguation Methods and Their Evaluation,""1997, Proceedings of SIGLEX '97, Washington, D.C., pp. 79-86."

"Resnik, Philip, ""Mining the Web for Bilingual Text,""1999, 37th Annual Meeting of the ACL, College Park, MD, pp. 527-534."

Rich, E. And Knight, K., "Artificial Intelligence, Second Edition," 1991, McGraw-Hill Book Company [Front Matter].

"Richard et al., ""Visiting the Traveling Salesman Problem with Petri nets and application in the glass industry,""Feb. 1996, IEEE Emerging Technologies and Factory Automation, pp. 238-242."

"Robin, Jacques, ""Revision-Based Generation of Natural Language Summaries Providing Historical Background: Corpus-Based Analysis, Design Implementation and Evaluation,"" 1994, Ph.D. Thesis, Columbia University, New York."

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

"Russell, S. and Norvig, P., ""Artificial Intelligence: A Modern Approach,"" 1995, Prentice-Hall, Inc., New Jersey [Front Matter]."

"Sang, E. and Buchholz, S., ""Introduction to the CoNLL-2000 Shared Task: Chunking,"" 2002, Proc. ofCoNLL-2000 and LLL-2000, Lisbon, Portugal, pp. 127-132."

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

"Schutze, Hinrich, ""Automatic Word Sense Discrimination,"" 1998, Computational Linguistics, Special Issue on WordSense Disambiguation, vol. 24, Issue 1, pp. 97-123."

"Selman et al., ""A New Method for Solving Hard Satisfiability Problems,"" 1992, Proc. of the 10th National Conferenceon Artificial Intelligence, San Jose, CA, pp. 440-446."

Kumar, S. and Byrne, W., "Minimum Bayes-Risk Decoding for Statistical Machine Translation." HLTNAACL Conference. Mar. 2004, 8 pages.

"Shapiro, Stuart (ed.), ""Encyclopedia of Artificial Intelligence, 2nd edition"""", vol. D 2,1992, John Wiley & Sons Inc;""""Unification"""" article, K. Knight, pp. 1630-1637."

Shirai, S., "A Hybrid Rule and Example-based Method for Machine Translation," NTT Communication Science Laboratories, pp. 1-5.

"Sobashima et al., ""A Bidirectional Transfer-Driven Machine Translation System for Spoken Dialogues,"" 1994, Proc.of 15th Conference on Computational Linguistics, vol. 1, pp. 64-68."

"Soricut et al., ""Using a Large Monolingual Corpus to Improve Translation Accuracy,"" 2002, Lecture Notes in Computer Science, vol. 2499, Proc. of the 5th Conference of the Association for Machine Translation in theAmericas on Machine Translation: From Research to Real Users, pp. 155-164."

"Stalls, B. and Knight, K., ""Translating Names and Technical Terms in Arabic Text,"" 1998, Proc. of the COLING/ACL Workkshop on Computational Approaches to Semitic Language."

"Sumita et al., ""A Discourse Structure Analyzer for JapaneseText,"" 1992, Proc. of the International Conference onFifth Generation Computer Systems, vol. 2, pp. 1133-1140."

"Sun et al., ""Chinese Named Entity Identification Using Class-based Language Model,"" 2002, Proc. of 19thInternational Conference on Computational Linguistics, Taipei, Taiwan, vol. 1, pp. 1-7."

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

"Taylor et al., ""The Penn Treebank: An Overview,"" in A. Abeill (ed.), D Treebanks: Building and Using ParsedCorpora, 2003, pp. 5-22."

"Tiedemann, Jorg, ""Automatic Construction of Weighted String Similarity Measures,"" 1999, In Proceedings ofthe Joint SIGDAT Conference on Emperical Methods in Natural Language Processing and Very Large Corpora."

"Tillman, C. and Xia, F., ""A Phrase-Based Unigram Model for Statistical Machine Translation,"" 2003, Proc. of theNorth American Chapter of the ACL on Human Language Technology, vol. 2, pp. 106-108."

"Tillmann et al., ""A DP Based Search Using Monotone Alignments in Statistical Translation,"" 1997, Proc. of theAnnual Meeting of the ACL, pp. 366-372."

Tomas, J., "Binary Feature Classification for Word Disambiguation in Statistical Machine Translation," Proceedings of the 2nd Int'l. Workshop on Pattern Recognition, 2002, pp. 1-12.

(56) References Cited

OTHER PUBLICATIONS

Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

"Ueffing et al., ""Generation of Word Graphs in Statistical Machine Translation,"" 2002, Proc. of Empirical Methods inNatural Language Processing (EMNLP), pp. 156-163."

Varga et al., "Parallel Corpora for Medium Density Languages", In Proceedings of RANLP 2005, pp. 590-596.

"Veale, T. and Way, A., ""Gaijin: A Bootstrapping, Template-Driven Approach to Example-Based MT,"" 1997, Proc. ofNew Methods in Natural Language Processing, Sofia, Bulgaria."

Vogel et al., "The CMU Statistical Machine Translation System," 2003, Machine Translation Summit IX, New Orleans, LA.

"Vogel et al., ""The Statistical Translation Module in the Verbmobil System,"" 2000, Workshop on Multi-Lingual SpeechCommunication, pp. 69-74."

"Vogel, S. and Ney, H., ""Construction of a Hierarchical Translation Memory,"" 2000, Proc. of Cooling 2000, Saarbrucken, Germany, pp. 1131-1135."

"Wang, Y. and Waibel, A., ""Decoding Algorithm in Statistical Machine Translation,"" 1996, Proc. of the 35th AnnualMeeting of the ACL, pp. 366-372."

"Wang, Ye-Yi, ""Grammar Inference and Statistical Machine Translation,"" 1998, Ph.D Thesis, Carnegie MellonUniversity, Pittsburgh, PA."

"Watanabe et al., ""Statistical Machine Translation Based on Hierarchical Phrase Alignment,"" 2002, 9th InternationalConference on Theoretical and Methodological Issues in Machin Translation (TMI-2002), Keihanna, Japan, pp. 188-198."

"Witbrock, M. and Mittal, V., ""Ultra-Summarization: A Statistical Approach to Generating Highly Condensed Non-Extractive Summaries,"" 1999, Proc. of SIGIR '99, 22nd International Conference on Research and Development inInformation Retrieval, Berkeley, CA, pp. 315-316."

"Wu, Dekai, ""A Polynomial-Time Algorithm for Statistical Machine Translation,"" 1996, Proc. of 34th Annual Meeting ofthe ACL, pp. 152-158."

"Wu, Dekai, ""Stochastic Inversion Transduction Grammars and Bilingual Parsing of Parallel Corpora,"" 1997, Computational Linguistics, vol. 23, Issue 3, pp. 377-403."

"Yamada, K. and Knight, K. ""A Syntax-Based Statistical Translation Model,"" 2001, Proc. of the 39th AnnualMeeting of the ACL, pp. 523-530."

"Yamada, K. and Knight, K., ""A Decoder for Syntax-Based Statistical MT,"" 2001, Proceedings of the 40th AnnualMeeting of the ACL, pp. 303-310."

Yamada K., "A Syntax-Based Statistical Translation Model," 2002 PhD Dissertation, pp. 1-141.

"Yamamoto et al., ""A Comparative Study on Translation Units for Bilingual Lexicon Extraction,"" 2001, JapanAcademic Association for Copyright Clearance, Tokyo, Japan."

Yamamoto et al, "Acquisition of Phrase-level Bilingual Correspondence using Dependency Structure" In Proceedings of COLING—2000, pp. 933-939.

"Yarowsky, David, ""Unsupervised Word Sense Disambiguation Rivaling Supervised Methods,"" 1995, 33rd AnnualMeeting of the ACL, pp. 189-196."

"Abney, Steven P. , ""Parsing by Chunks,"" 1991, Principle-Based Parsing: Computation and Psycholinguistics, vol. 44,pp. 257-279."

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., ""Translating with Scarce Resources,"" 2000, 17th National Conference of the American Associationfor Artificial Intelligence, Austin, TX, pp. 672-678."

Al-Onaizan, Y. and Knight K., "Machine Transliteration of Names in Arabic Text,"Proceedings of ACL Workshop on Computational Approaches to Semitic Languages. Philadelphia, 2002.

"Al-Onaizan, Y. and Knight, K., ""Named Entity Translation: Extended Abstract"", 2002, Proceedings of HLT-02, SanDiego, CA."

"Al-Onaizan, Y. and Knight, K., ""Translating Named Entities Using Monolingual and Bilingual Resources,"" 2002, Proc. of the 40th Annual Meeting of the ACL, pp. 400-408."

"Alshawi et al., ""Learning Dependency Translation Models as Collections of Finite-State Head Transducers,"" 2000, Computational Linguistics, vol. 26, pp. 45-60."

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

"Arbabi et al., ""Algorithms for Arabic name transliteration,"" Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

"Bangalore, S. and Rambow, O., ""Evaluation Metrics for Generation,"" 2000, Proc. of the 1st International NaturalLanguage Generation Conf., vol. 14, pp. 1-8."

"Bangalore, S. and Rambow, O., ""Using TAGs, a Tree Model, and a Language Model for Generation,"" May 2000,Workshop TAG+5, Paris."

"Bangalore, S. and Rambow, O., ""Corpus-Based Lexical Choice in Natural Language Generation,"" 2000, Proc. ofthe 38th Annual ACL, Hong Kong, pp. 464-471."

"Bangalore, S. and Rambow, O., ""Exploiting a Probabilistic Hierarchical Model for Generation,"" 2000, Proc. of 18thconf. on Computational Linguistics, vol. 1, pp. 42-48.".

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

"Barnett et al., ""Knowledge and Natural Language Processing,"" Aug. 1990, Communications of the ACM, vol. 33,Issue 8, pp. 50-71."

"Baum, Leonard, ""An Inequality and Associated Maximization Technique in Statistical Estimation for ProbabilisticFunctions of Markov Processes"", 1972, Inequalities 3:1-8."

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

"Brants, Thorsten, ""TnT—A Statistical Part-of-Speech Tagger,"" 2000, Proc. of the 6th Applied Natural LanguageProcessing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

"Brill, Eric. ""Transformation-Based Error-Driven Learning and Natural Language Processing: A Case Study in Partof Speech Tagging"",1995, Computational Linguistics, vol. 21, No. 4, pp. 543-565."

"Brown et al., ""A Statistical Approach to Machine Translation,"" Jun. 1990, Computational Linguistics, vol. 16, No. 2, pp. 79-85."

(56) References Cited

OTHER PUBLICATIONS

Brown et al., "Word-Sense Disambiguation Using Statistical Methods," 1991, Proc. of 29th Annual ACL, pp. 264-270.
"Brown et al., ""The Mathematics of Statistical Machine Translation: Parameter Estimation,"" 1993, ComputationalLinguistics, vol. 19, Issue 2, pp. 263-311."
"Brown, Ralf, ""Automated Dictionary Extraction for ""Knowledge-Free"" Example-Based Translation,""1997, Proc. of 7th Int'l Cont. on Theoretical and Methodological Issues in MT, Santa Fe, NM, pp. 111-118."
"Callan et al., ""TREC and TIPSTER Experiments with Inquery,"" 1994, Information Processing and Management,vol. 31, Issue 3, pp. 327-343."
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
"Carl, Michael. ""A Constructivist Approach to Machine Translation,"" 1998, New Methods of Language Processingand Computational Natural Language Learning, pp. 247-256."
"Chen, K. and Chen, H., ""Machine Translation: An Integrated Approach,"" 1995, Proc. of 6th Int'l Cont. on Theoreticaland Methodological Issue in MT, pp. 287-294."
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
"Clarkson, P. and Rosenfeld, R., ""Statistical Language Modeling Using the CMU-Cambridge Toolkit"", 1997, Proc. ESCA Eurospeech, Rhodes, Greece, pp. 2707-2710."
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Cohen, Yossi, "Interpreter for FUF," (available at ftp:/lftp.cs.bgu.ac.il/ pUb/people/elhadad/fuf-life.lf).
Corston-Oliver, Simon, ""Beyond String Matching and Cue Phrases: Improving Efficiency and Coverage inDiscourse Analysis"", 1998, The AAAI Spring Symposium on Intelligent Text Summarization, pp. 9-15.
Covington, "An Algorithm to Align Words for Historical Comparison", Computational Linguistics, 1996,vol. 22, No. 4, pp. 481-496.
"Dagan, I. and Itai, A., ""Word Sense Disambiguation Using a Second Language Monolingual Corpus"", 1994, Association forComputational Linguistics, vol. 20, No. 4, pp. 563-596."
"Dempster et al., ""Maximum Likelihood from Incomplete Data via the EM Algorithm"", 1977, Journal of the RoyalStatistical Society, vol. 39, No. 1, pp. 1-38."
"Diab, M. and Finch, S., ""A Statistical Word-Level Translation Model for Comparable Corpora,"" 2000, In Proc.of theConference on Content Based Multimedia Information Access (RIAO)."
"Diab, Mona, ""An Unsupervised Method for Multilingual Word Sense Tagging Using Parallel Corpora: APreliminary Investigation"", 2000, SIGLEX Workshop on Word Senses and Multi-Linguality, pp. 1-9."
Eisner, Jason, "Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, vol. 23 No. 2, pp. 195-239.
"Elhadad, M. and Robin, J., ""An Overview of SURGE: a Reusable Comprehensive Syntactic RealizationComponent,"" 1996, Technical Report 96-03, Department of Mathematics and Computer Science, Ben GurionUniversity, Beer Sheva, Israel."
Elhadad, M. and Robin, J., "Controlling Content Realization with Functional Unification Grammars", 1992, Aspects of Automated Natural Language Generation, Dale et al. (eds)., Springer Verlag, pp. 89-104.
Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Zhang et al., "Synchronous Binarization for Machine Translations," Jun. 4-9, 2006, in Proc. of the Human Language Technology Conference of the North American Chapter of the ACL, pp. 256-263.
Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
"Patent Cooperation Treaty International Preliminary Report on Patentability and the Written Opinion, Internationalapplication No. PCT/US2008/004296, Oct. 6, 2009, 5 pgs."
Document, Wikipedia.com, web.archive.org (Feb. 24, 2004) <http://web.archive.org/web/20040222202831 /http://en.wikipedia.org/wikiiDocument>, Feb. 24, 2004.
Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.reference.com/browse/identifying>.
Koehn, P. et al, "Statistical Phrase-Based Translation," Proceedings of HLT-NAACL 2003 Main Papers , pp. 48-54 Edmonton, May-Jun. 2003.
Abney, S.P., "Stochastic Attribute Value Grammars", Association for Computional Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.
Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.
Wang, W., et al. "Capitalizing Machine Translation" in HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
"Elhadad, Michael, ""FUF: the Universal Unifier User Manual Version 5.2"", 1993, Department of Computer Science,Ben Gurion University, Beer Sheva, Israel."
"Elhadad, Michael, ""Using Argumentation to Control Lexical Choice: A Functional Unification Implementation"",1992, Ph.D. Thesis, Graduate School of Arts and Sciences, Columbia University."
"Elhadad, M. and Robin, J., ""SURGE: a Comprehensive Plug-in Syntactic Realization Component for TextGeneration"", 1999 (available at http://www.cs.bgu.ac.il/-elhadad/pub.html)."
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the

(56) References Cited

OTHER PUBLICATIONS

Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> 'retrieved on May 6, 2004! abstract.
Ren, Fuji and Shi, Hongchi, "Parallel Machine Translation: Principles and Practice," Engineering of Complex Computer Systems, 2001 Proceedings, Seventh IEEE Int'l. Conference, pp. 249-259, 2001.
Fung et al, "Mining Very-Non-Parallel Corpora: Parallel Sentence and Lexicon Extraction via Bootstrapping and EM", in EMNLP 2004.
"Fung, P. and Yee, L., ""An IR Approach for Translating New Words from Nonparallel, Comparable Texts""", 1998,36th Annual Meeting of the ACL, 17th International Conference on Computational Linguistics, pp. 414-420."
"Fung, Pascale, ""Compiling Bilingual Lexicon Entries From a Non-Parallel English-Chinese Corpus""", 1995, Proc, of the Third Workshop on Very Large Corpora, Boston, MA, pp. 173-183."
"Gale, W. and Church, K., ""A Program for Aligning Sentences in Bilingual Corpora,""" 1991, 29th Annual Meeting of the ACL, pp. 177-183."
Gale, W. and Church, K., "A Program for Aligning Sentences in Bilingual Corpora," 1993, Computational Linguisitcs, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL 2004, July.
"Germann et al., ""Fast Decoding and Optimal Decoding for Machine Translation""", 2001, Proc. of the 39th Annual Meeting of the ACL, Toulouse, France, pp. 228-235."
"Germann, Ulrich: ""Building a Statistical Machine Translation System from Scratch: How Much Bang for the Buck Can We Expect?""" Proc. of the Data-Driven MT Workshop of ACL-01, Toulouse, France, 2001."
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
"Grefenstette, Gregory, ""The World Wide Web as a Resource for Example-Based Machine Translation Tasks""", 1999, Translating and the Computer 21, Proc. of the 21 st International Cant. on Translating and the Computer. London, UK, 12 pp.".
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
"Hatzivassiloglou, V. et al., ""Unification-Based Glossing""", 1995, Proc. of the International Joint Conference on Artificial Intelligence, pp. 1382-1389."
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.

Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
"Jelinek, F., ""Fast Sequential Decoding Algorithm Using a Stack""", Nov. 1969, IBM J. Res. Develop., vol. 13, No. 6, pp. 675-685."
"Jones, K. Sparck, ""Experiments in Relevance Weighting of Search Terms""", 1979, Information Processing &Management, vol. 15, Pergamon Press Ltd., UK, pp. 133-144."
Klein et al., "Accurate Unlexicalized Parsing," Jul. 2003, in Proc. of the 41st Annual Meeting of the ACL, pp. 423-430.
"Knight et al., ""Integrating Knowledge Bases and Statistics in MT,""" 1994, Proc. of the Conference of the Associationfor Machine Translation in the Americas."
"Knight et al., ""Filling Knowledge Gaps in a Broad-Coverage Machine Translation System""", 1995, Proc. of the14th International Joint Conference on Artificial Intelligence, Montreal, Canada, vol. 2, pp. 1390-1396."
"Knight, K. and Al-Onaizan, Y., ""A Primer on Finite-State Software for Natural Language Processing""", 1999 (available at http://www.isLedullicensed-sw/carmel)."
Knight, K. and Al-Onaizan, Y., "Translation with Finite-State Devices," Proceedings of the 4th AMTA Conference, 1998.
"Knight, K. and Chander, I., ""Automated Postediting of Documents,"""1994, Proc. of the 12th Conference on ArtificialIntelligence, pp. 779-784."
Knight, K. and Graehl, J., "Machine Transliteration", 1997, Proc. of the ACL-97, Madrid, Spain, pp. 128-135.
"Knight, K. and Hatzivassiloglou, V., ""Two-Level, Many-Paths Generation,""" 1995, Proc. of the 33rd AnnualConference of the ACL, pp. 252-260."
"Knight, K. and Luk, S., ""Building a Large-Scale Knowledge Base for Machine Translation,""" 1994, Proc. of the 12thConference on Artificial Intelligence, pp. 773-778."
"Knight, K. and Marcu, D., ""Statistics-Based Summarization—Step One: Sentence Compression,""" 2000, AmericanAssociation for Artificial Intelligence Conference, pp. 703-710."
"Knight, K. and Yamada, K., ""A Computational Approach to Deciphering Unknown Scripts,""" 1999, Proc. of the ACLWorkshop on Unsupervised Learning in Natural Language Processing."
"Knight, Kevin, ""A Statistical MT Tutorial Workbook,""" 1999, JHU Summer Workshop (available at http://www.isLedu/natural-language/mUwkbk.rtf)."
Knight, Kevin, "Automating Knowledge Acquisition for Machine Translation," 1997, Al Magazine, vol. 18, No. 4.
"Knight, Kevin, ""Connectionist Ideas and Algorithms,""" Nov. 1990, Communications of the ACM, vol. 33, No. 11, pp. 59-74."
"Knight, Kevin, ""Decoding Complexity in Word-Replacement Translation Models""", 1999, Computational Linguistics, vol. 25, No. 4."
"Knight, Kevin, ""Integrating Knowledge Acquisition and Language Acquisition""", May 1992, Journal of AppliedIntelligence, vol. 1, No. 4."
"Knight, Kevin, ""Learning Word Meanings by Instruction,"""1996, Proc. of the D National Conference on ArtificialIntelligence, vol. 1, pp. 447-454."
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
"Koehn, P. and Knight, K., ""ChunkMT: Statistical Machine Translation with Richer Linguistic Knowledge,""" Apr. 2002,Information Sciences Institution."
"Koehn, P. and Knight, K., ""Estimating Word Translation Probabilities from Unrelated Monolingual Corpora Usingthe EM Algorithm,""" 2000, Proc. of the 17th meeting of the AAAI."
"Koehn, P. and Knight, K., ""Knowledge Sources for Word-Level Translation Models,""" 2001, Conference on EmpiricalMethods in Natural Language Processing."

(56) References Cited

OTHER PUBLICATIONS

"Kumar, R. and Li, H., ""Integer Programming Approach to Printed Circuit Board Assembly Time Optimization,"" 1995,IEEE Transactions on Components, Packaging, and Manufacturing, Part B: Advance Packaging, vol. 18,No. 4. pp. 720-727."

Kupiec, Julian, "An Algorithm for Finding Noun Phrase Correspondences in Bilingual Corpora," In Proceedings of the 31st Annual Meeting of the ACL, 1993, pp. 17-22.

"Kurohashi, S. and Nagao, M., ""Automatic Detection of Discourse Structure by Checking Surface Information inSentences,"" 1994, Proc. of COL-LING '94, vol. 2, pp. 1123-1127."

"Langkilde, I. and Knight, K., ""Generation that Exploits Corpus-Based Statistical Knowledge,"" 1998, Proc. of theCOLING-ACL, pp. 704-710."

"Langkilde, I. and Knight, K., ""The Practical Value of N-Grams in Generation,"" 1998, Proc. of the 9th InternationalNatural Language Generation Workshop, pp. 248-255."

"Langkilde, Irene, ""Forest-Based Statistical Sentence Generation,"" 2000, Proc. of the 1st Conference on NorthAmerican chapter of the ACL, Seattle, WA, pp. 170-177."

"Langkilde-Geary, Irene, ""A Foundation for General-Purpose Natural Language Generation: SentenceRealization Using Probabilistic Models of Language,"" 2002, Ph.D. Thesis, Faculty of the Graduate School, Universityof Southern California."

"Langkilde-Geary, Irene, ""An Empirical Verification of Coverage and Correctness for a General-PurposeSentence Generator,"" 1998, Proc. 2nd Int'l Natural Language Generation Conference."

"Lee, Yue-Shi,""Neural Network Approach to Adaptive Learning: with an Application to Chinese Homophone Disambiguation,"" IEEE pp. 1521-1526."

Lita, L., et al., "tRuEcasIng," Proceedings of the 41st Annual Meeting of the Assoc. for Computational Linguistics (In Hinrichs, E. and Roth, D.—editors), pp. 152-159.

Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.

"Mann, G. and Yarowsky, D., ""Multipath Translation Lexicon Induction via Bridge Languages,"" 2001, Proc. of the2nd Conference of the North American Chapter of the ACL, Pittsburgh, PA, pp. 151-158."

"Manning, C. and Schutze, H., ""Foundations of Statistical Natural Language Processing,"" 2000, The MIT Press, Cambridge, MA [Front Matter]."

"Marcu, D. and Wong, W., ""A Phrase-Based, Joint Probability Model for Statistical Machine Translation,"" 2002, Proc.of ACL-2 conference on Empirical Methods in Natural Language Processing, vol. 10, pp. 133-139."

"Marcu, Daniel, ""Building Up Rhetorical Structure Trees,"" 1996, Proc. of the National Conference on ArtificialIntelligence and Innovative Applications of Artificial Intelligence Conference, vol. 2, pp. 1069-1074."

"Marcu, Daniel, ""Discourse trees are good indicators of importance in text,"" 1999, Advances in Automatic TextSummarization, The MIT Press, Cambridge, MA."

"Marcu, Daniel, ""Instructions for Manually Annotating the Discourse Structures of Texts,"" 1999, DiscourseAnnotation, pp. 1-49."

"Marcu, Daniel, ""The Rhetorical Parsing of Natural Language Texts,"" 1997, Proceedings of ACLIEACL '97, pp. 96-103."

"Marcu, Daniel, ""The Rhetorical Parsing, Summarization, and Generation of Natural Language Texts,"" 1997, Ph. D.Thesis, Graduate Department of Computer Science, University of Toronto."

"Marcu, Daniel, ""Towards a Unified Approach to Memory- and Statistical-Based Machine Translation,"" 2001, Proc.of the 39th Annual Meeting of the ACL, pp. 378-385."

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

"Melamed, I. Dan, ""A Word-to-Word Model of Translational Equivalence,"" 1997, Proc. of the 35th Annual Meeting ofthe ACL, Madrid, Spain, pp. 490-497."

"Melamed, I. Dan, ""Automatic Evaluation and Uniform Filter Cascades for Inducing N-Best Translation Lexicons,""1995, Proc. of the 3rd Workshop on Very Large Corpora, Boston, MA, pp. 184-198."

"Melamed, I. Dan, ""Empirical Methods for Exploiting Parallel Texts,"" 2001, MIT Press, Cambridge, MA [table ofcontents]."

"Meng et al.. ""Generating Phonetic Cognates to Handle Named Entities in English-Chinese Cross-LanguageSpoken Document Retrieval,"" 2001, IEEE Workshop on Automatic Speech Recognition and Understanding. pp. 311-314."

Metze, F. et al., "The NESPOLE! Speech-to-Speech Translation System," Proc. of the HLT 2002, 2nd Int'l. Conf. on Human Language Technology (San Francisco, CA), © 2002, pp. 378-383.

"Mikheev et al., ""Named Entity Recognition without Gazeteers,"" 1999, Proc. of European Chapter of the ACL, Bergen,Norway, pp. 1-8."

"Miike et al., ""A Full-Text Retrieval System with a Dynamic Abstract Generation Function,"" 1994, Proceedings of SI-GIR'94, pp. 152-161."

"Mohri, M. and Riley, M., ""An Efficient Algorithm for the N-Best-Strings Problem,"" 2002, Proc. of the 7th Int. Conf. onSpoken Language Processing (ICSLP'02), Denver, CO, pp. 1313-1316."

Mohri, Mehryar, "Regular Approximation of Context Free Grammars Through Transformation", 2000, pp. 251-261, "Robustness in Language and Speech Technology", Chapter 9, Kluwer Academic Publishers.

"Monasson et al., ""Determining Computational Complexity from Characteristic 'Phase Transitions',"" Jul. 1999, NatureMagazine, vol. 400, pp. 133-137."

"Mooney, Raymond, ""Comparative Experiments on Disambiguating Word Senses: An Illustration of the Role of Biasin Machine Learning,"" 1996, Proc. of the Conference on Empirical Methods in Natural Language Processing, pp. 82-91."

Nagao, K. et al., "Semantic Annotation and Transcoding: Making Web Content More Accessible," IEEE Multimedia, vol. 8, Issue 2 Apr.-Jun. 2001, pp. 69-81.

"Nederhof, M. and Satta, G., ""IDL-Expressions: A Formalism for Representing and Parsing Finite Languages inNatural Language Processing,"" 2004, Journal of Artificial Intelligence Research, vol. 21, pp. 281-287."

"Nieben, S. and Ney, H, ""Toward Hierarchical Models for Statistical Machine Translation of Inflected Languages,"" 2001,Data-Driven Machine Translation Workshop, Toulouse, France, pp. 47-54."

Norvig, Peter, "Techniques for Automatic Memoization with Applications to Context-Free Parsing", Compuational Linguistics,1991, pp. 91-98, vol. 17, No. 1.

"Och et al., ""Improved Alignment Models for Statistical Machine Translation,"" 1999, Proc. of the Joint Conf. ofEmpirical Methods in Natural Language Processing and Very Large Corpora, pp. 20-28."

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.

"Och, F. and Ney, H, ""Improved Statistical Alignment Models,"" 2000, 38th Annual Meeting of the ACL, Hong Kong, pp. 440-447."

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

"Papineni et al., ""Bleu: a Method for Automatic Evaluation of Machine Translation,"" 2001, IBM Research Report, RC22176(WQ102-022)."

(56) References Cited

OTHER PUBLICATIONS

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
"Pla et al., ""Tagging and Chunking with Bigrams,"" 2000, Proc. of the 18th Conference on Computational Linguistics, vol. 2, pp. 614-620."
Qun, Liu, "A Chinese-English Machine Translation System Based on Micro-Engine Architecture," An Int'l. Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, Training Tree Transducers, in NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Mar. 1, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 9, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed Mar. 1, 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problmens and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Advisory Action, Aug. 5, 2013, U.S. Appl. No. 11/272,460, filed Nov. 9, 2005.
Notice of Allowance, Oct. 2, 2013, U.S. Appl. No. 11/107,304, filed Apr. 15, 2005.
Non-Final Office Action, Sep. 11, 2013, U.S. Appl. No. 11/635,248, filed Dec. 5, 2006.
Non-Final Office Action, Mar. 29, 2013, U.S. Appl. No. 12/077,005, filed Mar. 14, 2008.
Advisory Action, Sep. 27, 2013, U.S. Appl. No. 11/811,228, filed Jun. 8, 2007.
Advisory Action, Jun. 20, 2013, U.S. Appl. No. 12/510,913, filed Jul. 28, 2009.
Non-Final Office, Action Sep. 24, 2013, U.S. Appl. No. 12/720,536, filed Mar. 9, 2010.
Advisory Action, Jun. 26, 2013, U.S. Appl. No. 13/089,202, filed Apr. 18, 2011.

\* cited by examiner

PROVIDING HUMAN-GENERATED AND MACHINE-GENERATED TRUSTED TRANSLATIONS

CROSS-REFERENCE TO RELATED APPLICATION

The present application is a Continuation-in-Part and claims the priority benefit of prior U.S. patent application Ser. No. 12/572,021 filed Oct. 1, 2009 now U.S. Pat. No. 8,380,486 and entitled "Providing Machine-Generated Translations and Corresponding Trust Levels," and is related to U.S. patent application Ser. No. 12/510,913 filed Jul. 28, 2009 and entitled "Translating Documents Based on Content." The disclosures of both aforementioned applications are incorporated herein by reference.

BACKGROUND OF THE INVENTION

Translations of documents from a source one language to a target language are typically handled by people or by machines. Translation services usually focus on one or the other, but not both. Most machine translation services do not provide a choice of machine translation or human translation options to a customer.

Further, human translations are typically more expensive than machine translations and peer reviewed. The human translation quality is usually confirmed by review of one or more other people. Inevitably, the translation skills of different reviewers will vary from person to person. Therefore, the quality of a peer reviewed translation may be subjective based on the skill of the particular reviewer, and may vary between translation. This results in an uneven measure of human translation reviews and inconsistent quality.

SUMMARY OF THE INVENTION

The present technology allows customers having a translation project to select a translation method from a variety of options, ranging from a completely human translation to a completely automated translation. The human translation option may include one or more users translating portions of a translation project. The users may be harnessed through one or more network service modules (end point modules) which execute within a network service application, such as a web-based networking application. A network service module may register a user having an account with the network service application as a translator and communicate translation jobs to the user. One or more users who express interest in performing the translation are selected to perform a translation job, each job comprising at least a portion of the translation project. After a user provides a translation for the translation job, the translation is analyzed to generate a trust level prediction for the translation. A user translation profile may be updated after each translation to reflect the user's performance. User performance may be based on an automatically generated trust score, failure to provide a translation and other information. The translation and rating information is provided to the user and to the network service module within the web service application.

An embodiment may provide a trusted translation by receiving a human-generated translation of a document from a source language to a target language. A trust level prediction of the human-generated translation may be generated. The trust level may be associated with a translational accuracy of the human-generated translation. The human-generated translation and the trust level may then be output.

An embodiment may process a translation job by receiving user information from a user having an account with a network service. The user information may be received by a network service module. Translation job information may be received from a remote application by the network service module. The translation job information may be provided to the user.

DETAILED DESCRIPTION OF EXEMPLARY EMBODIMENTS

The present technology allows customers having a translation project to select a translation method from a variety of options, ranging from a completely human translation to a completely automated translation. The human translation option may include one or more users translating portions of a translation project. The users may be harnessed through one or more network service modules (end point modules) which execute within a network service application, such as a web-based networking application. A network service module may register a user having an account with the network service application and communicate translation jobs to the user.

A user may request to perform one or more jobs that are communicated to the user. One or more users who express interest in performing the translation are selected to perform a translation job, each job comprising at least a portion of the translation project. User selection may depend on past user translation performance, ability to complete past translations on time, and other information. Once a user provides a translation for the translation job, the translation is analyzed to generate a trust level prediction for the translation. A user translation profile may be updated after the translation or failure to complete the translation to reflect the user's performance. The translation and rating information is provided to the user and to the network service module within the web service application.

Figure 1:
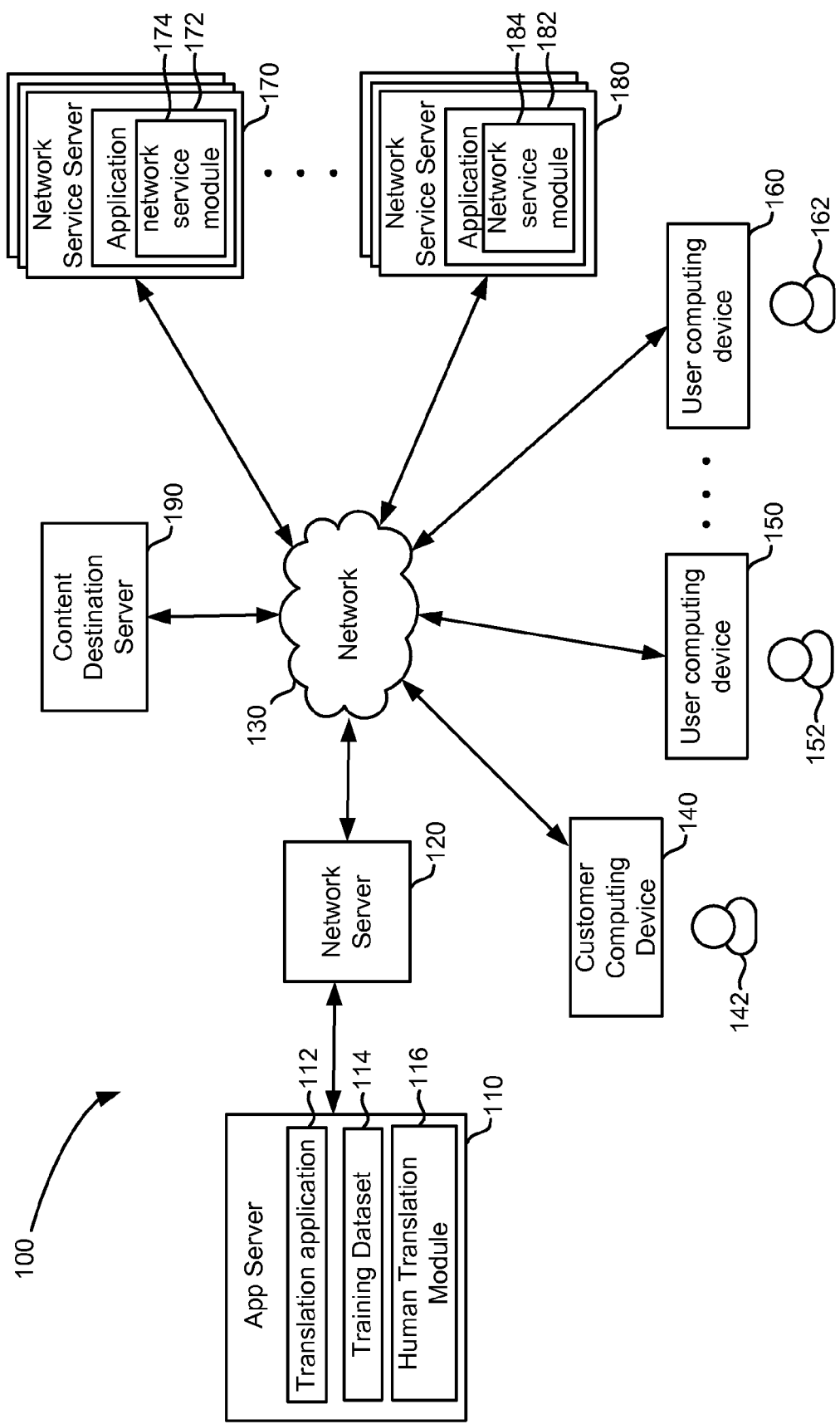
FIG. 1 is a block diagram of an exemplary system for providing a trusted translation.

FIG. 1 is a block diagram of an exemplary system for providing a trusted translation. System 100 of FIG. 1 includes application server 110, network server 120, network 130, customer computing device 140, user computing devices 150 and 160, network service servers 170 and 180, and content destination server 190.

Application server 110 may be implemented as one or more servers and may process requests received over network 130 via network server 120. Application server 110 may communicate with network server 120 and may include translation application 112, training data set 114, and human translation module 116. The functionality of application server 110 is discussed in more detail below with respect to the methods of FIGS. 3-5.

Translation application 112 may include one or more applications executed by a processor to generate a machine translation. Translation application 112 may also be executed to predict a translation quality of a human generated translation or machine translation, provide an interface to customers for requesting and managing translation projects, and other functions.

Human translation module 116 may be executed to communicate with remote network service modules installed on remote machines (for example, modules executing within applications on network service servers). The human translation module may manage user translation profiles and communicate translation job information, user translation profile information, and other data with a network service module.

Network server 120 communicates with application server 110 and network 130. The network server may be implemented as one or more machines that process requests for application server 110 and provide responses to requesting entities. The responses may be generated by application server 110 or network server 120. When network 130 is implemented as the Internet, network server 120 may be implemented as a web server.

Network 130 may be implemented as a local area network, wide area network, private network, public network, an intranet, the Internet, or a combination of these networks.

Customer computing device 140 may be utilized by a customer 142 to request services provided by application server 110. In particular, customer computing device 140 may transmit a request to translation application 112 to configure a translation project, select a type of translation, configure network service modules for the human translation, and complete a translation.

The present technology may utilize one or more users to implement crowd sourced-based human translations. Users 152 and 162 may access translation job information provided by a network service module and submit translations to application server 110 through computing devices 150-160. Each of computing devices 140, 150 and 160 may communicate with other devices over network 130. Though only two user computing devices are illustrated, more or fewer user computing devices may be present in system 100.

As illustrated, a system 100 may include one or more network service servers, such as servers 170 and 180, which may include applications 172 and 182, respectively. Each of network service servers 170 and 180 may be implemented as one or more servers which provide a service over network 130. The service may be accessed by network service users or a machine translation customer over network 130. Network service server 170 may include an application 172. The application may implement a network service over network 130, such as for example a networking service, business service, or some other service. Examples of web services provided by an application 172 include Facebook, Linked In, Pro-Z, and other services.

One or more endpoint modules may be embedded within or execute to communicate with an application within a network service. Network service module 174 may be imbedded within application 172 and may interact with users which subscribe to and/or have an account with a service provided by application 172. When executed, network service module 174 may register a user with the network service module, provide information regarding translation jobs, and select one or more users to perform a translation. The implementation of registering a user, publishing a translation job, and selecting users to perform translations may vary depending on the platform and application in which the network service module 174 executes within. Operation for network service module 174 is discussed in more detail below with respect to FIG. 6.

Network service module 184 may execute within application 182, and may operate similarly to network service module 174. Though system 100 illustrates one network service module within each application, other variations of applications within a server and network service modules associated with an application are possible.

Content destination server may communicate with network 130 and receive translated content to be published or stored. The content destination server 190 may be implemented as a customer web site, an online document, or some other content, and may publish translations generated by crowd sourcing or machine translation.

Figure 2:
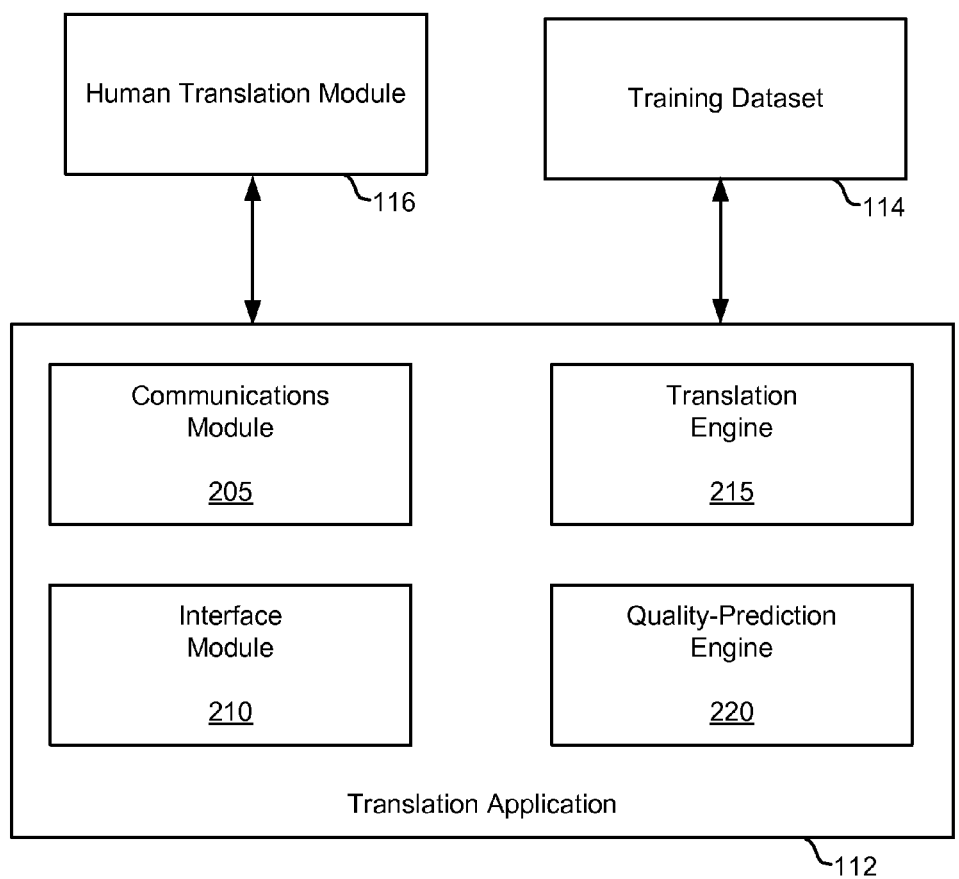
FIG. 2 is a block diagram of an exemplary application server module.

FIG. 2 is a block diagram of an exemplary application server module. In some embodiments, the application of FIG. 2 provides more detail for the application modules of application server 110 in FIG. 1. A human translation module 116 may identify jobs in a translation project, as well as manage communications, parameters, and other portions of a crowd-sourced translation project. The human translation module 116 may communicate job information to a network service module based on a translation project configured by a customer. Human translation module 116 may also manage user translation profiles. The translation profiles may be updated based on a status of a translation, a trust score generated based on a completed translation, and other information such as for example subject matter expertise for a particular user translator.

Translation application 112 may include communications module 205, interface module 210, translation engine 215, and quality prediction engine 220. Translation application 112 may be executed to manage communication with a customer through customer computing device 140, interface with remote devices, translate a document to generate translated content, and provide a quality prediction of a user generated translation.

Communications module 205 may be executed to allow an indication to be received via a user interface to provide a translation of a document from a source language to a target language, as well as a prediction of a trust level of the translation. The communications module 205 may also facilitate accessing the document to be translated such as in response to an indication by a user.

The interface module 210 can be executed to provide a graphical user interface through a network browser, for example as a content page provided by a web browser, which enables a user to request the translation and corresponding trust-level prediction.

The translation engine 215 comprises a machine translation engine capable of translating from a source language to a target language. Such translation capability may result from training the translation engine 215 on various training data. In some embodiments, the translation application 112 may include more than one translation engines 215. Additionally, the translation engine 215 may be based on statistical-translation techniques, non-statistical-translation techniques, or a combination thereof.

As depicted in FIG. 2, the translation engines 215 is associated with the training dataset 225. According to other exemplary embodiments, the translation engine 215 can be associated with any number of training datasets. The training dataset 225 may comprise documents in source languages and corresponding translations of those documents in target languages (i.e., parallel corpora). The translated documents may be human-generated or machine-generated. The training dataset 225 may be domain-specific or generic.

According to exemplary embodiments, the quality prediction engine 220 is executable to predict a trust level of a translation provided by the translation engine 215. The trust-level prediction is indicative of translational accuracy of translations generated by the translation engine 215. The trust level is predicted independent of a human-generated translation or other human intervention.

An example of translation application 112 is described in U.S. patent application Ser. No. 12/572,021, entitled "Providing Machine-Generated Translation and Corresponding Trust Levels," which was filed on Oct. 1, 2009, and is incorporated herein by reference in its entirety.

The interaction between the translation service provided by application server 110 and network server 120, a customer requesting a translation, and users providing crowd source translation is discussed in more detail with respect to FIGS. 3-6 and may be summarized as follows. A translation project may be communicated to translation application 112, for example by customer 142 using customer computing device 140 to define a project through translation application 112. The details of the translation job may be provided by customer computing device 140 over network 130 to translation application 112, for example through a web page provided by translation application 112. Once the project configuration is completed, information regarding translation jobs consisting of one or more portions of the translation project may be transmitted to selected network service modules embedded in network services. Selected users who wish to perform the translation jobs are paired with the jobs by network service modules which receive job information. Users obtain access to the content to be translated and either complete a translation or do not complete a translation under a specified set of criteria. A trust score may be generated based on the translation, or failure to complete a translation. A user translation profile may also be updated. The translation is reported to a content destination server and feedback regarding a translation is provided to the translating user.

Figure 3:
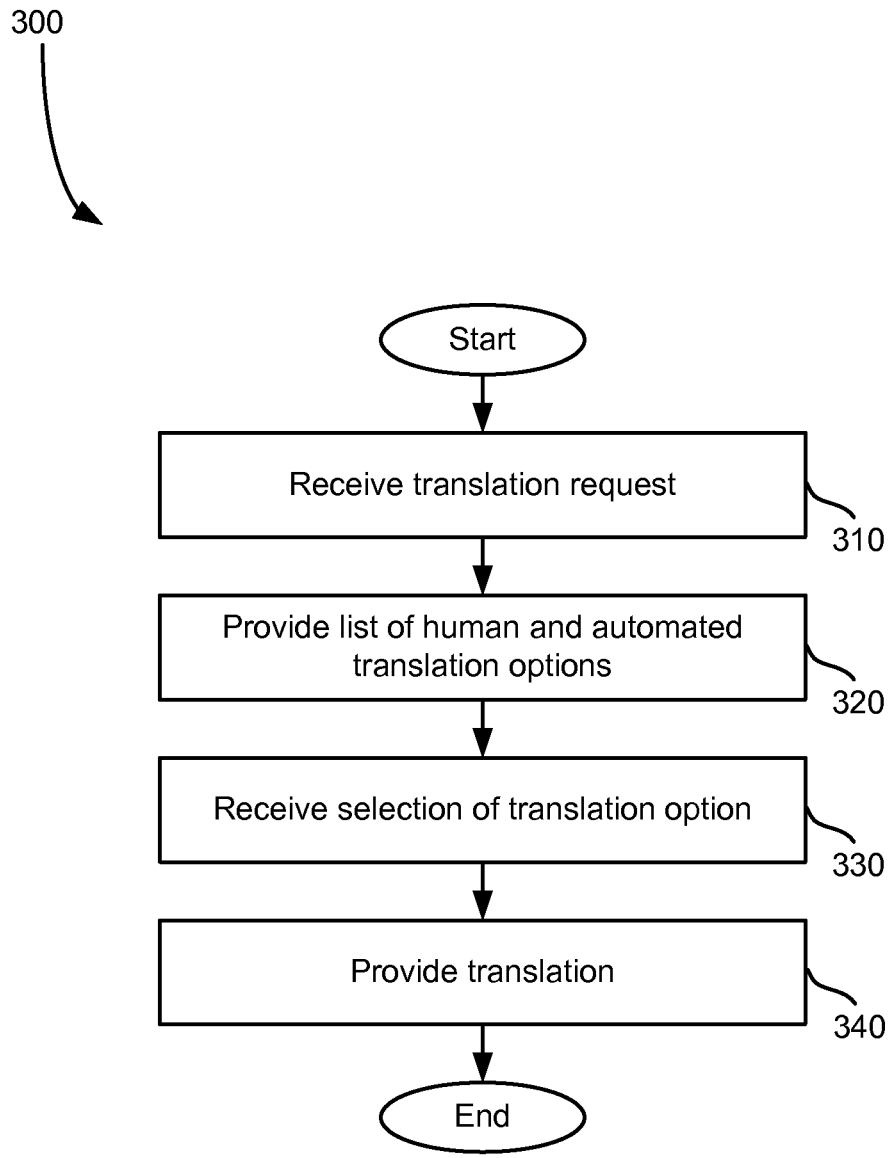
FIG. 3 is a flow chart of an exemplary method for providing a trusted translation.

FIG. 3 is a flow chart of an exemplary method for providing a trusted translation. The method of FIG. 3 may be performed by portions of system 100 in the system of FIG. 1. First, a translation request is received at step 310. The request may be received by application server 110 from a customer with documents to be translated. For example, the translation may be received through an interface such as a web page interface provided by translation application 112 over network 130.

A list of human and automated translation options may be provided at step 320. The list of translation options may be provided through an interface provided by translation application 112. The options may allow the customer to select between a fully automated translation, a machine translation with post-editing performed by a human, crowd source generated translation (non-professional human translation), and professional human translation for converting documents in a source language to documents in a target language.

A selection of a translation option is received from a customer at step 330. Hence, a single translation service provided by the present technology allows a user to select any of several translation methods. The selection may be received through an interface provided by translation application 112. The translation is generated and provided per the customer request at step 340. If selected, the professional translation may be performed by a professional translator as requested by a customer. A requested machine translation may be performed by translation engine 215 of translation application 112. A machine translation with a post-edits may be performed in the same way, however a human may review the translation provided by translation engine 215. A crowd source application may be provided by users registered with an end point application embedded in a network service. Crowd source translation is discussed in more detail below with respect to FIGS. 4-6.

For each translation provided by the present technology, whether by human translation or machine translation, a trust score may be predicted for the translation. Hence, whether the translation is generated by a user, by machine translation, or a combination of these, the present technology may generate a trust score to predict a trust level of the resulting translation. The trust score may be generated by quality prediction engine 220 as discussed above.

At step 330 in the method of FIG. 3, a customer may indicate that a translation should be performed by crowd sourcing. In this case, a customer may provide details to configure parameters associated with the crowd sourced translation by one or more nonprofessional translators. The method of FIG. 4 outlines an exemplary method for allowing a customer to configure a translation to be performed by multiple nonprofessional translators (i.e., via crowd sourcing).

Figure 4:
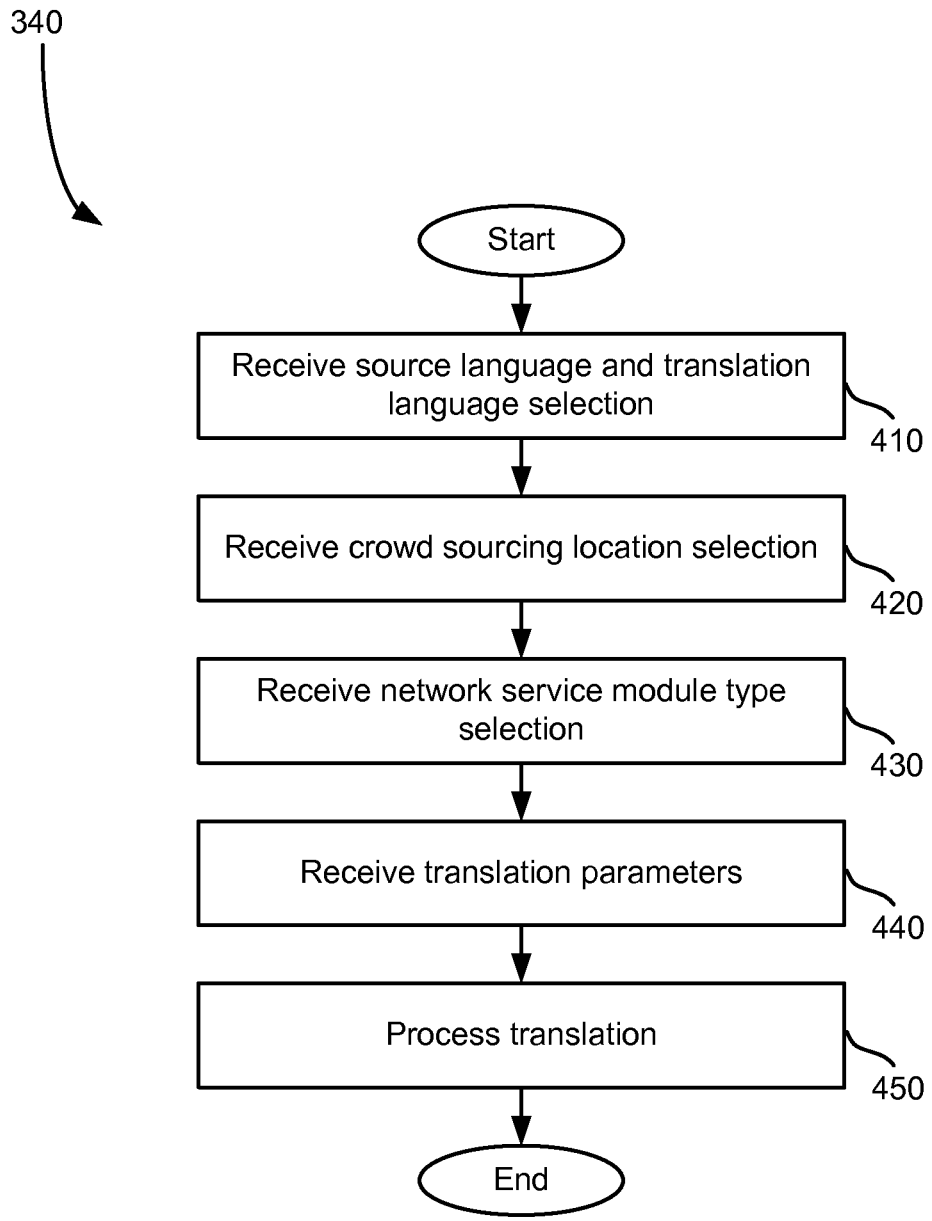
FIG. 4 is a flow chart of an exemplary method for providing a trusted human translation.

FIG. 4 is a flow chart of an exemplary method for providing a trusted human translation. The method of FIG. 4 provides more detail for step 340 in the method of FIG. 3, for example when a customer requests a translation generated via crowd sourcing. The method of FIG. 4 provides exemplary steps for configuring parameters for a crowd-sourced translation project. Configuration of such a translation project may include the steps of FIG. 4, fewer steps, and additional configuration steps.

A source language and translation language selection are received at step 410. For example, when a customer configures a translation project, the customer may indicate that the translation should be performed from an English source language to a French target language.

A crowd sourcing location selection may be received at step 420. When the source language and translation language selection is received at step 410, the present technology may determine the locations of available translators that may perform the translation. For example, the translators may be located in a particular country, a particular state, or some other location. The locations may indicate availability of users registered with an end point application and able to perform the requested translation.

A network service module selection is received at step 430. After a customer has selected the language translation pair, the customer may select types of application network service modules to publish translation job information. Types of network service module may correspond to the network service application in which the network service module operates. Examples of a network service module types may include a Facebook network service module, Linked-In network service module, Pro-Z network service module, Second Life network service module. Human translation module 116 may maintain a table or list of network service module types which correspond to a particular language pair, location, and other data. The table or list may be updated upon receiving user registration details from a network service module at a particular network service application.

Translation parameters may be received at step 440. The translation parameters may include general translation parameters and end point specific parameters. For example, translation parameters may include a message to send to potential translator users, whether or not to enable e-mail notification of available translation jobs by a network service module, and whether or not to post available translation jobs to a module content page. Additional translation parameters may include payment terms, currency, type of reward to receive, and other compensation information. For example, the compensation for translation may include cash, virtual goods having value within the application, rewards, a thank you button, gift vouchers, and other items of real or virtual value. The compensation for a translation may vary per end point value. Additional translation parameters may include a project budget and project timing information, such as for example a time limit and maximum budget for which to spend on the particular translation. Other project-related items such as review and recurrence may also be configured as a translation parameter.

Figure 5:
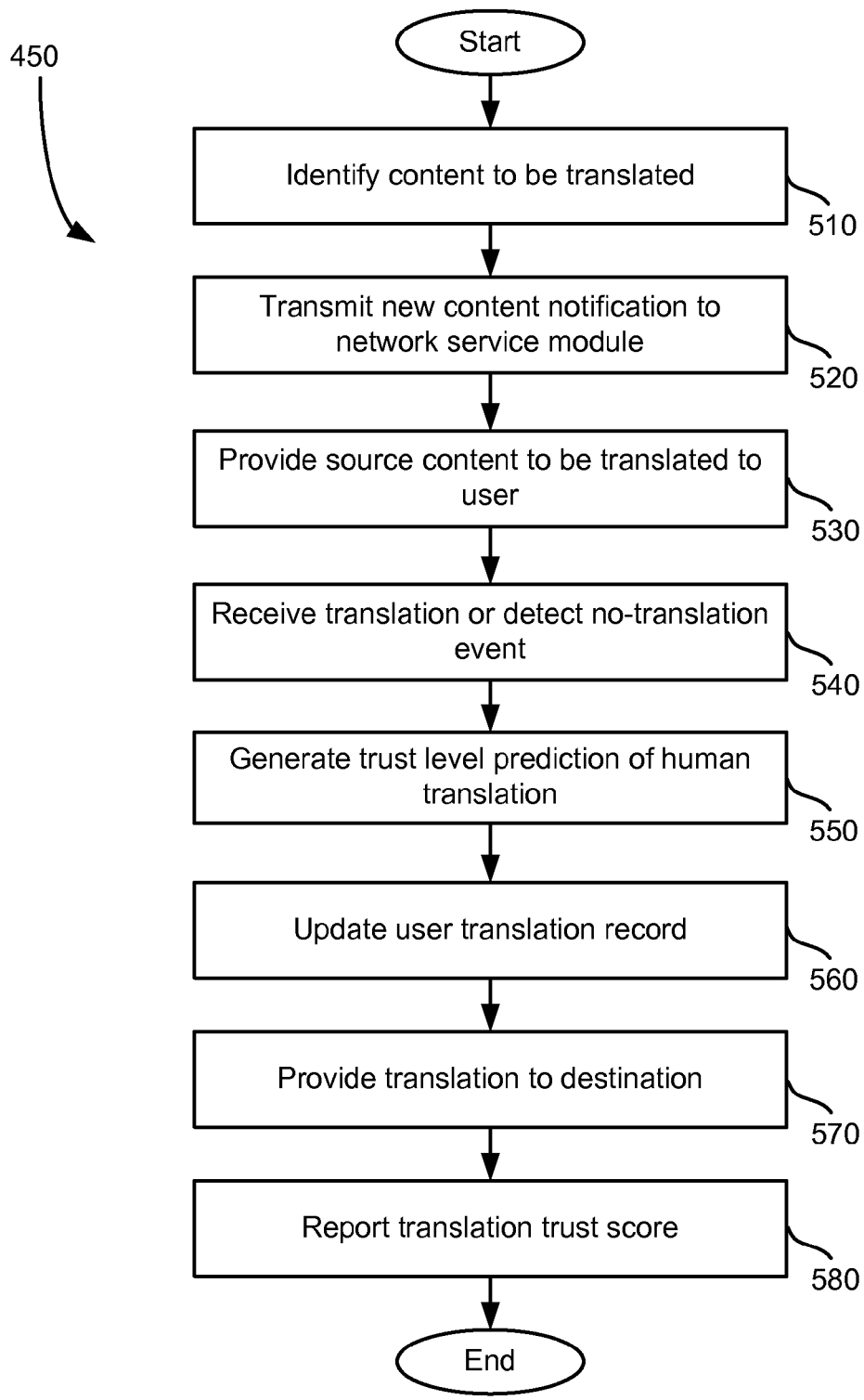
FIG. 5 is a flow chart of an exemplary method for providing a translation.

A translation may be processed at step 450. Processing a translation may include sending translation notification information to a network service module, selection of one or more users to perform the translation by the network service module, having the selected users perform the translation, and processing the translation by application server 110. Trust scores may be generated for translations performed by users. Processing a translation is discussed in more detail below with respect to the methods of FIGS. 5 and 6. FIG. 5 describes processing a translation from the point of view of application server 110, and FIG. 6 describes processing a translation from the point of view of a network service module.

FIG. 5 is a flow chart of an exemplary method for providing a translation. The method of FIG. 5 provides more detail for step 450 of the method of FIG. 4 from the context of translation application 112.

First, content to be translated is identified at step 510. The content to be translated may be a document which is accessed from a remote location. The document to be translated may also be identified based on the location of the content rather than retrieving the content itself. The identification may include receiving the location of the content, or the content itself, by translation application 112.

A new content notification is transmitted by application server 110 to network service modules at step 520. The new content notification is an indication of one or more translation jobs. A new content notification may include a customer message for a user, a location and/or a link to the content to be translated and information to enable a network service module select a translator, such as a classification of the document content to be translated. The network service modules selected at step 430 may receive the new content notification.

Source content to be translated is provided to selected users by application server 110 at step 530. A network service module may receive the content notification sent at step 520, provide the information to one or more users, receive indications from one or more users interested in performing a translation, selecting one or more users to perform the translation, and provide the selected users with job information for accessing the content from application server 110. The job information regarding the content to translate may include application server contact information or other information to provide the user with access to the content to be translated. In some embodiments, a user may be provided with a link to an interface (provided by translation application 112) provided by application server 110 which provides the content to be translated.

The translation or detection of a no-translation event is received at step 540. Once a selected user completes a translation job, the user may indicate this to the application server, for example, through an interface in which the translation is being provided. If the translation is not completed within a certain amount of time, or for some other reason a user fails to complete a translation, a detect no-translation event is triggered. The no-translation event indicates the user failed to complete a translation of the content. The detect no-translation event may be associated with an expiration of a period of time (for example, a maximum allowed time in which to complete the translation), a cancellation of the translation by the user, or some other event. Upon detecting a no-translation event, the translation job will be re-sent to the selected network service modules to reassign the translation job.

A trust level prediction of the human translation provided by the user is generated at step 550. Quality prediction engine 220 may generate the trust score based on the translation provided by the user. If a selected user does not complete a translation, the trust level prediction is not generated.

The user translation record is updated at step 560. The user translation record may reflect a user's predicted trust score, translations not completed, customer feedback on user translations, and other data. For example, user trust levels may be averaged to generate an overall score. The user's failure to complete a translation may reduce the overall score. In some embodiments, the higher the level of accuracy and the more consistently a user completes a translation, the better the translation overall score.

The complete translation is provided to a destination server at step 570. In some embodiments, the translation may be provided by translation application 112 to content destination server 190. The translation provided may be based on the predicted trust level score determined at step 550 (i.e., the translation may be provided only if the predicted trust level meets a minimum threshold level, for example 95%).

The translation predicted trust score may be reported at step 580. The predicted trust score may be reported to the user to inform the user of their translation quality. Overall score information may also be provided to the user. The predicted trust score and/or overall score may also be provided to the network service module to enable the module to select the most qualified interested users for future translation jobs.

Figure 6:
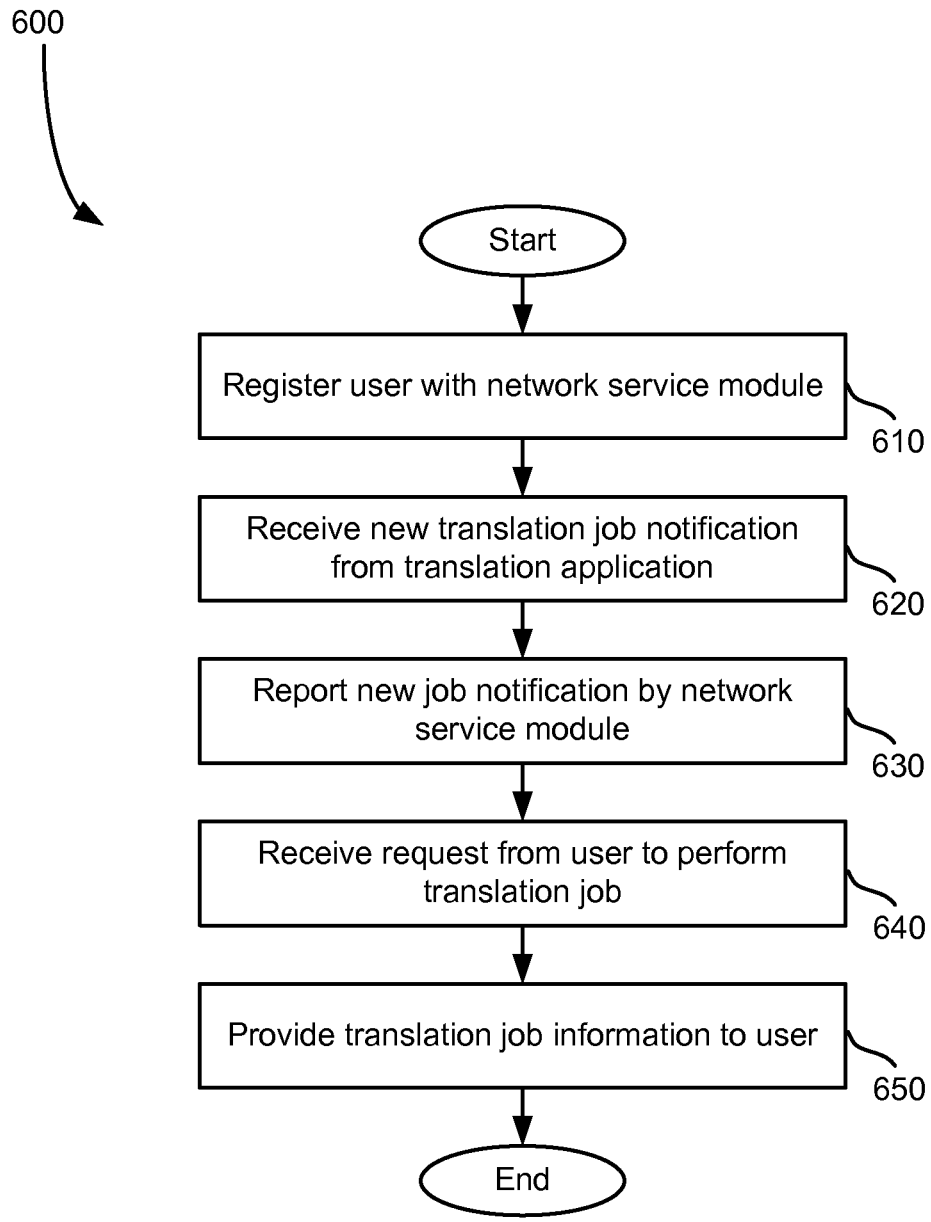
FIG. 6 is a flow chart of an exemplary method for handling a translation job.

FIG. 6 is a flow chart of an exemplary embodiment for handling a translation job. The method of FIG. 6 may be performed by a network service module within an application, such as for example network service module 174 within application 172.

A user registers with a network service module at step 610. To register with a network service module, the user may first register with an application 172 which network service module 174 is embedded within or communicates with. Once registered with application 172, or having an account with application 172, a user may register with a network service module associated with the application. Registration with a network service module may include providing a user name, contact information, e-mail, translation skills (e.g., languages able to perform translations in), indication of other network service modules in which the user is registered, and other information.

A new translation job notification may be received by a network service module from translation application 112 at step 620. The information received for a new translation job may be the same information sent by translation application 112 at step 520 in the method of FIG. 5. The notification may include, for example, a message from a customer to prospective user translators, language pair information, a location for a user to access content to be translated, and other data.

New job notifications are reported by a network service module to registered users at step 630. The new job notification may be reported to users registered with the particular network service module that receives the new translation job notification. The reporting may be made by e-mail, message notification, or some other communication sent by a network service module to a registered user. The notification may also be made by reporting the new job notification data to a page associated with the network service module within the application in which it is embedded, such as for example a bulletin board, content page, favorites page, or some other location.

A request may be received from one or more registered users by a network service module to perform a translation job at step 640. The translation job information is provided to one or more selected users at step 650. The users selected to perform the translation may by the requesting users which have the highest overall score, the first users to reply to the job notification, or may be selected in some other manner. The translation job information provided to the user may include a link with additional information to start the translation job. When a user selects the link to access the content to be translated, translation application 112 may receive this request as discussed above with respect to step 530 in the method of FIG. 5. The user may then access the content to be translated and provide a translation. If the user does not complete the translation within a specified period of time, a no-translation event may be triggered and the translation job may be reported by an end-point module at step 630.

Figure 7:
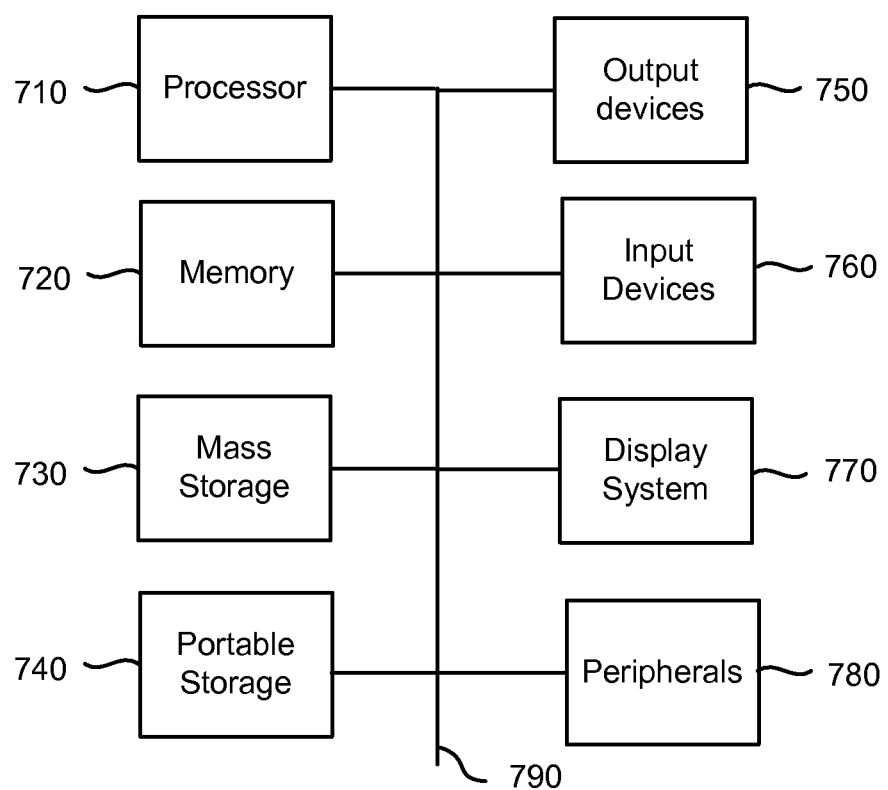
FIG. 7 is a flow chart of a computing device for implementing the present technology.

FIG. 7 is a flow chart of a computing device for implementing the present technology. In some embodiments, the system of FIG. 7 may be used to implement application server 110, network server 120, computing devices 140, 150 and 160, network service servers 170 and 180, and content destination server 190. The computing system 700 (also referred to as computer system 700) includes one or more processors 710 and main memory 720. Main memory 720 stores, in part, instructions and data for execution by processor 710. Main memory 720 can store the executable code when in operation. The computing system 700 further includes a mass storage device 730, portable storage medium drive(s) 740 (also referred to as portable storage device 740), output devices 750, user input devices 760, a graphics display 770 (also referred to as display system 770), and peripheral device(s) 780.

The components shown in FIG. 7 are depicted as being connected via a single bus 790. The components may be connected through one or more data transport means. The processor 710 and the main memory 720 may be connected via a local microprocessor bus, and the mass storage device 730, the peripheral devices 780, the portable storage medium drive(s) 740, and display system 770 may be connected via one or more input/output (I/O) buses.

The mass storage device 730, which may be implemented with a magnetic disk drive or an optical disk drive, is a non-volatile storage device for storing data and instructions for use by the processor 710. The mass storage device 730 can store the system software for implementing embodiments of the present technology for purposes of loading that software into the main memory 720.

The portable storage device 740 operates in conjunction with a portable non-volatile storage medium, such as a floppy disk, compact disk, digital video disc, or USB storage device, to input and output data and code to and from the computer system 700 of FIG. 7. The system software for implementing embodiments of the present technology may be stored on such a portable medium and input to the computer system 700 via the portable storage device 740.

The input devices 760 provide a portion of a user interface. The input devices 760 may include an alpha-numeric keypad, such as a keyboard, for inputting alpha-numeric and other information, or a pointing device, such as a mouse, a trackball, stylus, or cursor direction keys. Additionally, the computing system 700 as shown in FIG. 7 includes the output devices 750. Suitable output devices include speakers, printers, network interfaces, and monitors.

The display system 770 may include a liquid crystal display (LCD) or other suitable display device. The display system 770 receives textual and graphical information, and processes the information for output to the display device.

The peripheral device(s) 780 may include any type of computer support device to add additional functionality to the computer system. The peripheral device(s) 780 may include a modem or a router.

The components contained in the computer system 700 of FIG. 7 are those typically found in computer systems that may be suitable for use with embodiments of the present technology and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:
1. A method for providing a trusted translation, comprising:
receiving a human-generated translation of a document from a source language to a target language, the human-generated translation being produced by a person;

generating a trust level prediction of the human-generated translation based at least in part on a mapping by executing a quality-prediction engine stored in memory, the trust level prediction of the human-generated translation associated with translational accuracy of the human-generated translation, the quality-prediction engine being calibrated, the calibration including:
obtaining a plurality of opinions for a plurality of sample translations performed by the person, each of the opinions from a human and indicating a perceived trust level of corresponding sample translations, and
using the quality prediction-engine to determine a trust level of each of the plurality of sample translations,
determining a relationship between the plurality of opinions and the trust levels of each of the plurality of sample translations, and
tuning the mapping to minimize any difference between the plurality of opinions and the trust levels of each of the plurality of sample translations; and
outputting the human-generated translation and the trust level prediction of the human-generated translation.

2. The method of claim 1, further comprising providing an interface configured to receive a translation selection of one of a plurality of translation methods, the plurality of translation methods including both a human translation method and a machine translation method.

3. The method of claim 1, wherein outputting includes reporting information based on the trust level prediction to a user that generated the translation.

4. The method of claim 1, wherein outputting includes reporting information based on the trust level prediction to a module executing within a remote application.

5. The method of claim 1, further comprising transmitting translation information to a module executing within a remote application.

6. The method of claim 5, wherein the translation information includes a description of the translation to be performed.

7. The method of claim 5, wherein the translation information includes information for initiating access to the content to be translated.

8. The method of claim 1, further comprising receiving configuration information for a translation to be performed by humans.

9. The method of claim 8, wherein the configuration information includes a selection of one or more modules from a plurality of modules within one or more remote applications.

10. The method of claim 9, wherein the remote applications are network service applications executing on remote application servers.

11. A non-transitory computer readable storage medium having embodied thereon a program, the program being executable by a processor to perform a method for providing a trusted translation, the method comprising:
receiving a human-generated translation of a document from a source language to a target language, the human-generated translation being produced by a person;
generating a trust level prediction of the human-generated translation based at least in part on a mapping, the trust level associated with translational accuracy of the human-generated translation;
calibrating, the calibrating including:
obtaining a plurality of opinions for a plurality of sample translations performed by the person, each of the opinions from a human and indicating a perceived trust level of corresponding sample translations, and
using the quality prediction-engine to determine a trust level of each of the plurality of sample translations,
determining a relationship between the plurality of opinions and the trust levels of each of the plurality of sample translations, and
tuning the mapping to minimize any difference between the plurality of opinions and the trust levels of each of the plurality of sample translations; and
outputting the human-generated translation and the trust level prediction of the human-generated translation.

12. The non-transitory computer readable storage medium of claim 11, the method further comprising providing an interface configured to receive a translation selection of one of a plurality of translation methods, the plurality of translation methods including both a human translation method and a machine translation method.

13. The non-transitory computer readable storage medium of claim 11, wherein outputting includes reporting information based on the trust level prediction to a user that generated the translation.

14. The non-transitory computer readable storage medium of claim 11, wherein outputting includes reporting information based on the trust level prediction to a module executing within a remote application.

15. The non-transitory computer readable storage medium of claim 11, the method further comprising transmitting translation information to a module executing within a remote application.

16. The non-transitory computer readable storage medium of claim 15, wherein the translation information includes a description of the translation to be performed.

17. The non-transitory computer readable storage medium of claim 15, wherein the translation information includes information for initiating access to the content to be translated.

18. The non-transitory computer readable storage medium of claim 11, the method further comprising receiving configuration information for a translation to be performed by humans.

19. The non-transitory computer readable storage medium of claim 18, wherein the configuration information includes a selection of one or more modules from a plurality of modules within one or more remote applications.

20. The non-transitory computer readable storage medium of claim 19, wherein the remote applications are network service applications executing on remote application servers.

21. The method of claim 1, further comprising:
receiving user information from a user having an account with a network service by executing a network service module stored in memory;
receiving translation job information from a remote application by the network service module; and
providing the translation job information to the user.

22. The method of claim 21, wherein the user information includes user translation information.

23. The method of claim 21, wherein receiving user information includes registering the user with the network service module.

24. The method of claim 21, further comprising communicating the translation job information to users of the network service for which user information was received.

25. The method of claim 21, further comprising receiving a request from one or more users to perform the translation by the network service module.

26. The method of claim 21, further comprising selecting one or more users to perform the translation by the network service module.

27. The method of claim 21, further comprising receiving trust score information regarding a translation performed by a user.

* * * * *